(No Model.)

W. H. DUDDY.
DENTAL NAPKIN CLAMP.

No. 575,108. Patented Jan. 12, 1897.

WITNESSES.
Matthew M. Blunt.
C. C. Stecher

INVENTOR.
W. H. Duddy.
by A. W. Crossley
his ATT'Y.

THE NORRIS PETERS CO., PHOTO-LITHO., WASHINGTON, D. C.

UNITED STATES PATENT OFFICE.

WILLIAM H. DUDDY, OF BOSTON, MASSACHUSETTS, ASSIGNOR TO THE S. S. WHITE DENTAL MANUFACTURING COMPANY, OF PHILADELPHIA, PENNSYLVANIA.

DENTAL NAPKIN-CLAMP.

SPECIFICATION forming part of Letters Patent No. 575,108, dated January 12, 1897.

Application filed August 23, 1895. Serial No. 560,189. (No model.)

*To all whom it may concern:*

Be it known that I, WILLIAM H. DUDDY, of Boston, in the county of Suffolk and State of Massachusetts, have invented certain new and useful Improvements in Dentists' Napkin-Clamps, of which the following is a specification.

My invention relates to certain improvements, as hereinafter claimed, in devices of the class employed by dentists for securing napkins (suitable absorbent material) in position to absorb saliva and keep dry teeth being operated upon.

Figure 1:
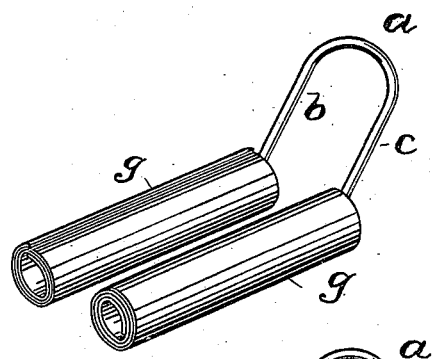
Figure 2:
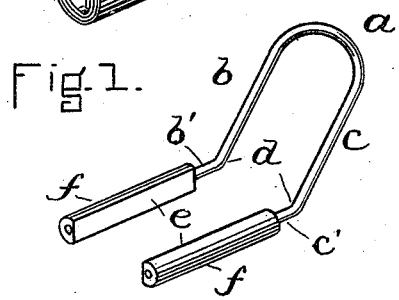
Figure 3:
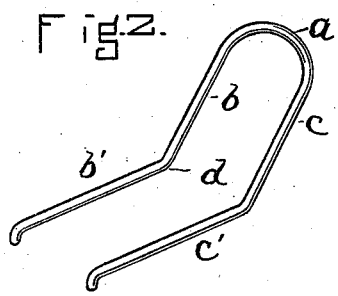

In the accompanying drawings, Figure 1 is a view in perspective of a holder or clamp made in accordance with my invention, provided with napkins in the form of rolls of absorbent material. Fig. 2 shows the preferred construction of the clamp or holder, the parallel arms of the device being thickened or provided with sleeves of rubber, gutta-percha, &c., to receive the napkins; and Fig. 3 shows the device in simpler form.

A single piece of spring-wire is bent at $a$, so as to constitute two members $b\ c$, which at the inner or rear end of the clamp are sufficiently separated to admit the teeth freely between them. The inner end of the device is thus adapted to loosely straddle the teeth and gum-margin without contact therewith. The members $b\ c$ are bent at $d$, so that the extensions or arms $b'\ c'$ thereof lie parallel with each other at an angle to the inner portion of the device, and are adapted to be adjusted one upon either side of the gum, so as to clamp absorbent material against opposite sides of the gum. Upon the extensions or arms $b'\ c'$ are molded or otherwise suitably secured sleeves $f\ f$ of some such material as rubber, gutta-percha, celluloid, &c., so as to provide enlarged clamping-surfaces $e\ e$ and afford a broad bearing for the napkins.

It will be seen that when the arms are suitably provided with absorbent material the device may quickly be adjusted, so that the material will be clamped and held by spring-pressure against the gum on either side of the roots of a line of teeth, while the inner portion or bowed end of the clamp does not engage or come in contact with a tooth adjacent to that being treated and does not interfere with the desired adjustment of the device.

Preferably the napkins are in the form of strips of absorbent cotton, which are wound around the arms $b'\ c'$ or around the sleeves $f\ f$ when they are provided on the arms. The rolls $g\ g$ of absorbent material may be dispensed with and an ordinary napkin may be used, if preferred, being held in place against the gum by the arms of the clamp.

When in use in the mouth, the free ends of the arms of the clamp are toward the lips, with the rear or bowed end $a$ thereof extending well toward the junction of the jaws, so as to be out of the way when the dentist is at work.

It will be seen that the device may quickly be adjusted to engage the gum and clamp the absorbent material against it.

I claim as my invention—

1. The dentist's napkin holder or clamp formed of a single piece of spring-wire bent to constitute two members adapting it to loosely straddle the teeth at its inner portion, and having two parallel arms extending at an angle to the inner portion, each free at its outer end, and adapted to extend along the gum on opposite sides of the roots of a line of teeth, whereby absorbent material wound about the arms may be clasped against the gum, substantially as set forth.

2. The dentist's napkin holder or clamp formed of wire bent to form two members adapting it to loosely straddle the teeth at its inner portion, and having two parallel arms extending at an angle to the inner portion and provided with sleeves to receive the napkins and hold them against the gum, substantially as set forth.

In testimony whereof I have signed my name to this specification, in the presence of two subscribing witnesses, this 15th day of August, A. D. 1895.

WILLIAM H. DUDDY.

Witnesses:
  MARCUS B. MAY,
  CHARLES A. HARKNESS.